United States Patent [19]

Lowe

[11] Patent Number: 4,712,679

[45] Date of Patent: Dec. 15, 1987

[54] ORGANIZER FOR COMPACT DISC ALBUMS AND THE LIKE

[76] Inventor: Gary C. Lowe, 9321 Mansfield, Morton Grove, Ill. 60053

[21] Appl. No.: 921,548

[22] Filed: Oct. 22, 1986

[51] Int. Cl.⁴ .............................................. B65D 85/672
[52] U.S. Cl. .................................... 206/387; 211/40;
206/444; 206/425; 206/561; 220/20
[58] Field of Search ............... 206/387, 425, 561, 444;
211/40; 220/20, 22

[56] References Cited

U.S. PATENT DOCUMENTS

| | | | |
|---|---|---|---|
| 3,756,383 | 9/1973 | Kryter | 220/20 |
| 3,856,369 | 12/1974 | Commiant | 206/387 |
| 4,231,473 | 11/1980 | Aprahamian | 211/40 |
| 4,293,075 | 10/1981 | Veralrud | 211/40 |
| 4,375,850 | 3/1983 | Smyth et al. | 206/387 |
| 4,394,055 | 7/1983 | Smith | 206/387 |
| 4,407,411 | 10/1983 | Lowry | 220/22 |
| 4,432,453 | 2/1984 | Berkman | 206/387 |

Primary Examiner—Joseph Man-Fu Moy
Attorney, Agent, or Firm—Walter C. Ramm

[57] ABSTRACT

A container for thin rigid envelopes, each of which is a solid and has length greater than width the thickness much less than width—such as the package for a compact disc record album—having connected lower and upper levels. The lower level defines transverse and longitudinal axes of the container as well as a number of cavities with upwardly-disposed open ends, and the upper level comprises an exterior retaining wall and opposed ledges extending at an angle from the wall. An envelope may be inserted, width-edge down, into and held in one of the cavities; alternatively, such envelope may be placed on the upper level, length-wise on its lower edge and transverse the longitudinal axis of the container, with its lower corners supported, respectively, by the ledges. A spacer may be inserted into a cavity to separate the envelopes into distinct organizational groupings.

9 Claims, 9 Drawing Figures

ORGANIZER FOR COMPACT DISC ALBUMS AND THE LIKE

FIELD OF THE INVENTION

The present invention relates to novel article which is a container and organizer for compact disc albums and similar thin rigid envelopes. The invention is adapted systematically to hold and file a number of such envelopes. Particularly, it enables such holding and filling in two distinct modes.

BACKGROUND OF THE INVENTION

Compact disc recordings have recently become a popular medium and of substantial commercial importance in the cultural, musical and entertainment environment in many parts of the world.

The packaging and presentation of compact discs has become subject to a notable degree of standardization in several aspects. Single-disc albums of most brands of compact discs are sold to and kept by the ultimate owners thereof in relatively thin, rectangular packages of substantially uniform dimensions. Most such albums have titles, and the title—which typically identifies or describes the performing artist or group and the work or pieces recorded on the disc—appears along one of the edges of its package. The cover or front side of the album usually includes pictorial or graphic matter having meaningful association with the disc or its subject matter.

The need exists for a container or arrangement for the systemized holding, storage and filing of compact disc packages in a way which readily enables the owners thereof economically and easily to have, enjoy and avail themselves of such standardization aspects. The present invention addresses and meets such need.

SUMMARY OF THE INVENTION

In this summary, and hereafter in this specification, these definitions apply: (i) "thin rigid envelope" means a rigid, three-dimensional package which is characterized by length greater than width and height (or edge-thickness) not more than 25% of width, and is easily held and manipulated by an individual with her/his hand(s); (ii) "title edge" means an edge of a thin rigid envelope on which a title appears in much the same manner as a book title appears on the book's spine; and, (iii) "CD album" means a thin rigid envelope for a single compact disc recording which envelope has these closely-approximate dimensions in inches: length=5.56, width=4.88, and edge-thickness=0.41; and, a title edge as one of its "width" edges. For purposes of the present disclosure, a CD album has a cover which is hinged to open from the edge opposite the title edge, and, in the prior art and the trade, is sometimes called a "jewel box." The principle of this invention is not limited to CD albums but applies also to other thin rigid envelopes such as a conventional audio casette which has these closely-approximate dimensions in inches: length=4.38, width=2.75 and edge-thickness=0.67; and, a title edge as one of its "length" edges.

This invention provides a container with capability for holding and organizing thin rigid envelopes, such as CD albums and audio casettes, in two holding/organizational modes. An exemplary container of the invention is open at its top, and has a symmetrical bottom and two levels. The first level includes and extends upwardly from the bottom and has an exterior perimetral portion and, interiorally, a plurality of slots or cavities. Each cavity or slot has an upwardly-disposed open end of a size and shape which admits the downwardly-inserted shorter or "width" edge-portion of a CD album but excludes the album's larger or "length" edge-portion.

The second level extends at an angle from the exterior perimetral portion of the first level, providing opposed ledges and leaving open space across the ends of the cavities. The interior transverse dimension of the second level is slightly greater than the length of CD album. A portion of such transverse dimension, above and across the open ends of the cavities, is substantially less than the length of such envelope. The second level includes a perimetral retaining member.

This invention also involves spacer-elements. Each spacer is sized to be insertable in one of the slots and, as inserted, to extend well above the ledges of the second level, to sub-divide the each level of the container.

According to the first mode of this invention with the said exemplary container, CD albums are inserted into the cavities, each with its title-edge upward. The albums may be thus organized into several groupings—such as by type of music, performer, or composer—and the groupings established by one or more spacers between them.

In the second mode the CD albums are placed lengthwise on and across the second level of the container, each album with corner-portions of its lower edge on and supported by the ledges. The CD albums of one organizational grouping—thus supported and kept from lateral displacement by the perimetral retaining member—are disposed either between spacers or between the perimetral retaining member and a spacer. In each grouping of CD albums in such disposition, the albums are not tightly packed, but allowed sufficient space so that, relative to the bottom, they may be tilted in and between different acute and obtuse angles of repose.

BRIEF DESCRIPTION OF THE DRAWINGS

The present invention will be better understood by reading the following detailed description in connection with the accompanying drawings.

DESCRIPTION OF PREFERRED EMBODIMENT

Figure 1:
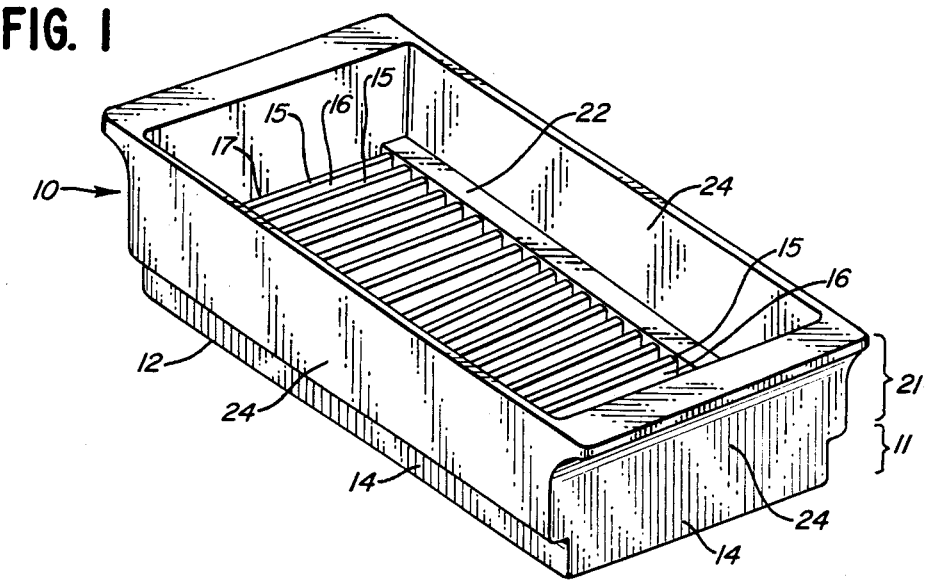
FIG. 1 is a general perspective view of the container of this invention standing, on its bottom, on a flat surface.

FIGS. 1, 2, 3, 5 and 6 show a preferred form of embodiment of the container of the present invention, and in those drawings the reference numerals identify various features of this invention, as follows: 10 is the container, 11 is the base level of container 10, 12 is the bottom of container 10 (a part of base level 11), 14 is the exterior perimetral wall of base level 11, 15 is each of several interior walls which divide first level 11 into a number of slots or cavities, 16 is each of several adjacent slots or cavities on base level 11, 17 is each of two-end slots or cavities on base level 11, 21 is the upper level of container 10, 22 is each of two opposed ledges of upper level 20, 24 is the upper perimetral retaining wall, 26 is a handle portion, 32 is a thin spacer [see also FIG. 4B], 34 is each of several CD albums, 35 is the front of a CD album 34, 36 is the title edge of a CD album 34, 37 is a group of several CD albums 34 in the static mode of this invention, and 38 is a group of several CD albums in the scan mode of this invention.

Figure 4A:
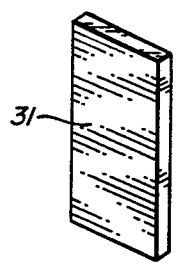
FIG. 4 shows perspective views of three spacer elements—4A is a simple six-sided rectangular polyhedron, 4B is a thin spacer, and 4C is a T-shaped spacer.
Figure 4B:
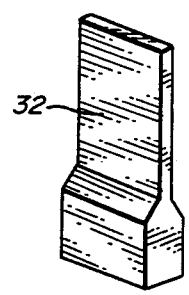
Figure 4C:
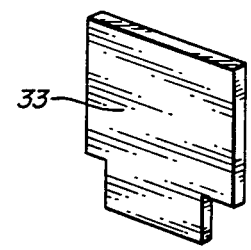
Figure 5:
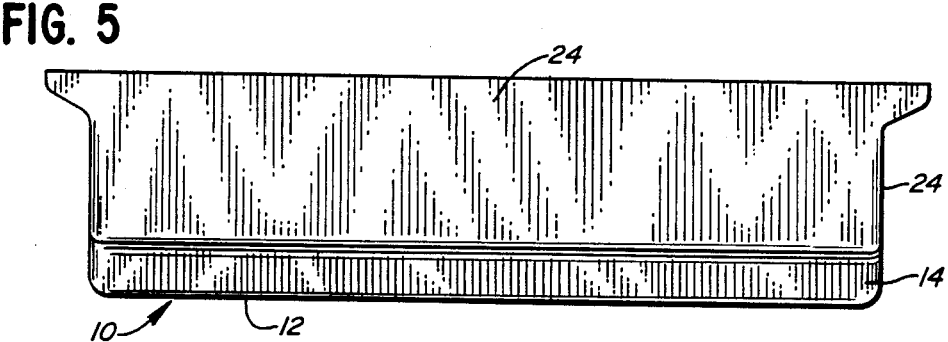
FIG. 5 is a side elevation of the container of FIG. 1.
Figure 6:
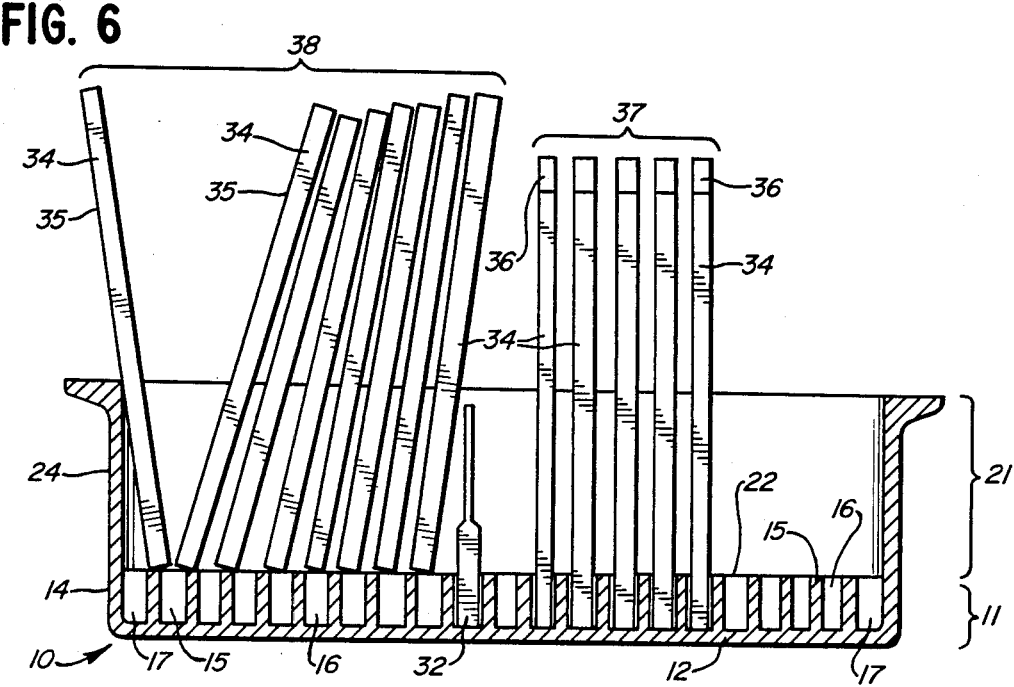
FIG. 6 is a side sectional elevation of the container of FIG. 1 along line 6—6 of FIG. 3 illustrating the two modes of this invention—the right side of shows CD albums in the "static" mode while the left side shows the albums in the "scan" mode.

FIG. 4 shows several forms of spacers: numeral 31 (FIG. 4A) is a block spacer, numeral 32 (FIG. 4B) is a thin spacer [see also FIG. 6], and numeral 33 (FIG. 4C) is a T-spacer.

Figure 2:
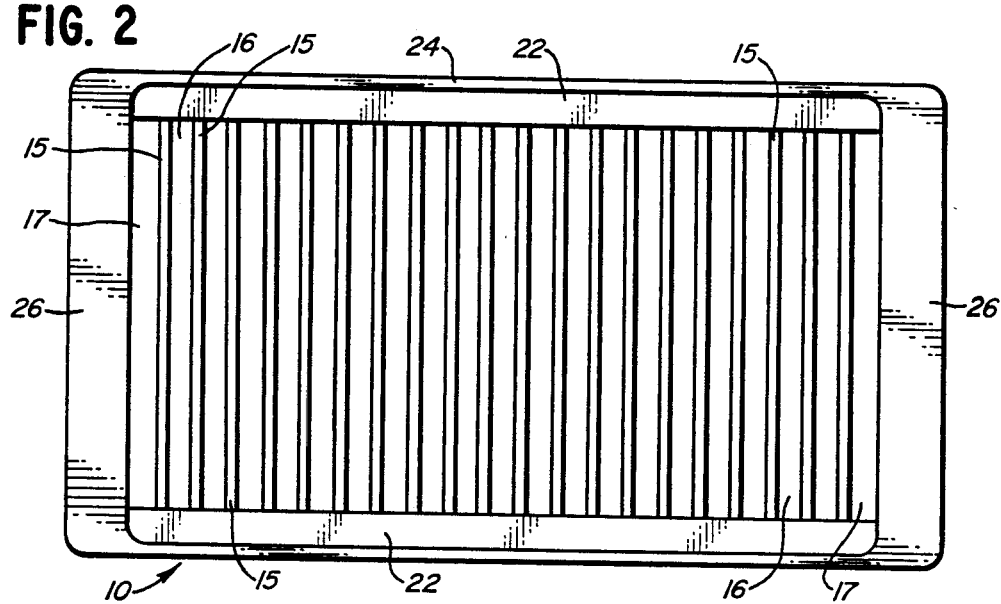
FIG. 2 is a plan view of the container of FIG. 1.
Figure 3:
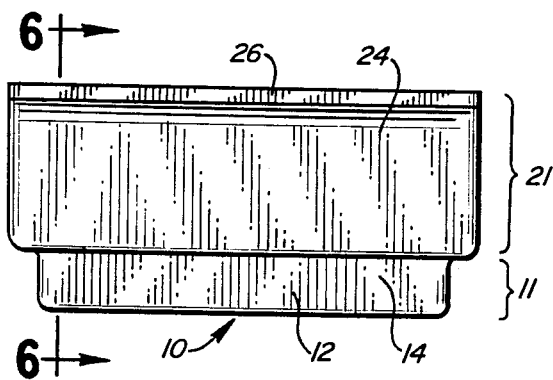
FIG. 3 is an end-on elevation view of the container of FIG. 1.

FIGS. 2, 3 and 6 detail the general layout and operational arrangement of container 10. Container 10 has and rests on the rectangular bottom 12 which defines longitudinal (or lengthwise) and transverse axes as well as two sides and two end-portions of the container. Base level 11 is defined by exterior perimetral wall 14. Within wall 14, container 10 provides upwardly-disposed cavities or slots 16, each defined by bottom 11, wall 14, and two adjacent interior walls 15, and the two end-cavities 17, each defined by one such wall 15, bottom 12 and wall 14.

Upper lever 21—like a balcony—is above, connected with and extends outwardly from wall 14 of base level 11, and it includes the opposed, substantially coplanar ledges 22 and upper wall 24 extending along and upwardly from the respective outward edges of the ledges 22.

Two particular considerations apply with respect to exemplary container 10—first, it may be advantageously be injection molded as a unitary piece, and second, it is it interiorally dimensioned for CD albums. Thus, taking into account the size of a CD album as well as the design requirements of the mold, on base level 11, and along the longitudinal axis of the rectangle defined by bottom 12, each cavity 16 has a design width of 0.425 inch, each end-cavity 17 at its top has a design width of 0.456 inch, and each interior wall 15 has a design width of 0.062 inch. Transverse to such longitudinal axis, each interior wall 15 and, thus, each cavity 16 and 17 has the dimension of 5 inches. Each cavity 16 and 17 is 0.0625 inch deep, measured downwardly from th plane of ledges 22.

On upper level 21, the overall dimension transverse to such longitudinal axis, from the inside of upper wall 24 on one side of the container to the inside upper wall 24 on the other side, the overall dimension (across the space above the upward open ends of cavities 16 and 17) is 5 inches and the width of each ledge 22 is 0.375 inch.

Other structural and functional details pertain to this invention. In the exemplary, injection-molded container 10, the thickness of bottom 12, exterior wall 14, ledges 22 and retaining wall 24 may each be approximately 0.125 inch. Interior walls 15 may impart rigidity to container 10 although in other embodiments an interrupted cavity or opposed slots or grooves could serve in place of the fully-formed cavities 15. The lower portion of each spacer—31, 32 or 33—is adapted to be inserted in and received by a cavity 16. Block spacer 31 is the simplest form, but a "thin" spacer 32 requires less material to make and provides a slightly enlarged space allowance for the scan mode of organization as shown by the sketch of FIG. 6, with thin spacer 32 and several CD albums 34 in the scan mode as identified by numeral 38 (and as more fully described below). As inserted, a spacer should extend upward and at least well into upper level 21; in FIG. 6, the upper portion of spacer 32 attains almost the same height as the upper edge of upper wall 24.

The embodiment of FIGS. 1-7 is adapted for distinct static and scan modes. In the static mode, when the individual using the invention has established the suitable organizational grouping of CD albums, she/he inserts the several albums of the grouping into adjacent cavities 16, or 16 and 17, each with its title edge 36 upward, and then, into the next (yet unfilled) cavity 16, inserts a spacer, such as spacer 32. In FIG. 6 the albums 34 in static mode are identified by numeral 37. The spacer may be labelled to identify the grouping with legends, for example, such as "jazz", "classical" and "rock". When the individual desires to play the disc of one of the thus-organized CD albums—there being ample hand room within the dimensions thus described—he/she simply lifts the album from container 10. Meanwhile, the several other albums, with their titles in plain sight, are out of harm's way.

Figure 7:
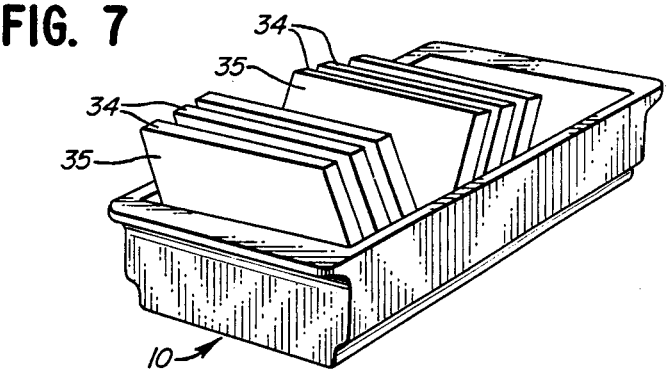
FIG. 7 is a perspective sketch of a group of CD albums in the container of FIG. 1 as the group is being flipped through or scanned.

The scan mode, disclosed in part of FIG. 6 and in the sketch of FIG. 7, enables the individual to scan or flip through the CD albums of one or several groupings. According to the scan mode, a group of CD albums (typically, those comprising an organizational grouping) are placed length-wise across upper level 21 of container 10, each with its two bottom corners on and supported by one of the opposed ledges 22. In such placement the albums 34 of the group are restrained from lateral movement by upper wall 24 and their front portions 35 are in plain sight. In the configuration of FIG. 6, the upper edges of interior walls 15, being coplanar with edges 22, may also protect against unwanted placement of a scan-mode albums 34 into a cavity 16.

As suggested by numeral 38 in the configuration of FIG. 6, space for such scan mode placement along the direction of the longitudinal axis of bottom 11 is defined by spacer 32 and retaining wall 24 at one end of container 10, and such space is ample so that—rather than being tightly packed into the space—a tilting allowance is provided, and some albums 34 rest at an acute angle, and one at an obtuse angle with reference to bottom 11. They may be turned, upper edge over, from one such angle to the other and not otherwise displaced. In FIG. 7, for example, albums 34 are in the described placement at both such angles. With the tilting allowance, an individual who wishes to select one or several albums for playing may be readily hand-flip through and scan the front covers of all CD albums in a grouping or, indeed, all such albums so placed in container 10, thus availing her/himself of the pictorial or graphic material there presented.

Container 10 may have any reasonable or convenient capacity. Any exemplary size provides nineteen cavities on the base level.

Figure 8:
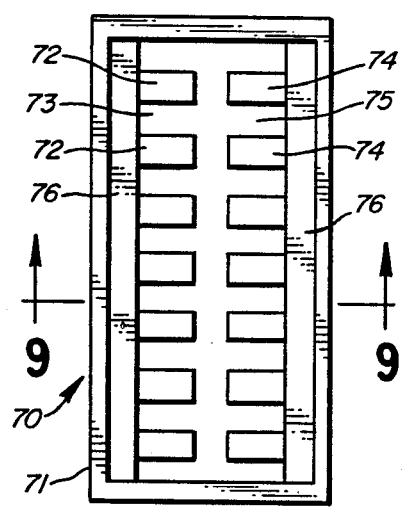
FIG. 8 shows the plan view of an alternative form of the container of this invention wherein opposed grooves, rather than fully formed cavities, are provided by the container.
Figure 9:
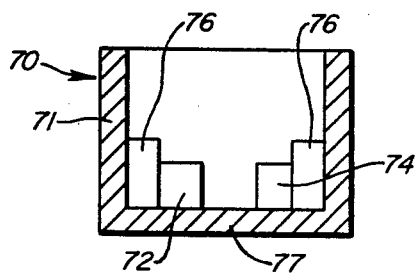
FIG. 9 is a sectional end-on view of the container of FIG. 8 taken along line 9—9 of FIG. 8.

FIGS. 8 and 9 show an alternate embodiment of a container of the present invention and additional reference numerals identify parts thereof, as follows: 70 is the container, 71 is the exterior perimetral wall of container 70, 72 are opposed interior wall or sub-divider portions on one side of container 70, 73 is a first slot or groove defined by wall portions 72, 74 are opposed interior wall or sub-divider portions on the other side of container 70, 75 is a second slot or groove defined by wall portions 74 and opposed to first slot 73, 76 is each of two opposed ledges, and 77 is the bottom.

In this alternate embodiment the vertical aspect of the interior wall portions 72 and 74 is shorter than the height of the opposed ledges, and the pair of opposed grooves 73 and 75 define a dimension along the longitudinal axis of the container of a space wherein a thin rigid envelope may be inserted in the static mode. The transverse interruption, respectively, between opposed subdivider portions such as 72 and 74 enables an individual readily by hand to retrieve from the groove an envelope whereof the then-vertical dimension is less than the height of the interior wall portions or less than the height of the ledges.

A container such as container 70 may well carry and organize CD albums, in the manner heretofore described, in both static and scan modes. It is equally within the scope of this invention, however, to dimension such a container and its several elements so that a first groove 73 and its opposed second groove 75 may together receive and carry other types of thin rigid envelope. For example, if the pair of opposed grooves, such as grooves 73 and 75, are spaced by a dimension along the longitudinal axis of such a container of, say, 0.75 inch, they readily accommodate an audio casette with its title edge up.

Accordingly, thin rigid envelopes of a first type—for example, CD albums—may be carried on the ledges in the scan mode while at least one thin rigid envelopes of a second type—for example, an audio casette—is carried in the static mode within the space defined by the pair of opposed grooves, such as grooves 73 and 75 in FIG. 8. In this connection, it may well be acceptable for the then-vertical aspect of such a second-type envelope to exceed the height of the ledges, such as ledges 76 in FIG. 9, and such second-type envelope thus to function as a spacer the first-type envelopes.

A container of this invention, such as container 10, and the spacers may be made of any suitable material, and as unitary piece or assembled from several separate pieces or components. In the injection-molded unitary piece herein described, container 10 is fabricated of high impact polystyrene.

What is claimed is:

1. A container for thin rigid envelopes, each envelope having uniform size and characterized by length greater than width and thickness not more than 25% of width, wherein the envelopes may be organized in each of two modes and which comprises
   a bottom;
   a lower perimetral member extending upwardly from the bottom;
   interior wall portions connected with the bottom and having a height not exceeding the height of the lower perimetral member which define a plurality of cavities whereof each has an upper open end of which one dimension exceeds the width of the envelope but is less than the length of the envelope and another dimension exceeds the thickness of the envelope;
   a first ledge extending from the perimetral member along one portion of the container,
   a second ledge, opposed to the first ledge and extending from the perimetral member along another portion of the container, and
   an upper retaining member connected with each ledge;
   so for one organizational mode an envelope may be inserted, width-edge downward, into a cavity and carried on the bottom, and, for another organizational mode, at least one such envelope may be placed length-wise onto the opposed first and second ledges, supported at each of its lower corners by one of the ledges, and kept from lateral displacement by the upper retaining member.

2. The container of claim 1 where the article is a has a length:width:thickness ratio of approximately 15:13:1; the lower perimetral member and the upper retaining member are walls; the bottom is rectangular; and, the ledges extend outwardly and are substantially coplanar.

3. An organizer comprising the container of claim 2 and also comprising at least one spacer which is adapted to be inserted into a cavity of the container and, as inserted, to rest on the bottom and extend upward to a height approximately equal to the height of the perimetral retaining member.

4. An organizer for compact disc albums—which albums are generally rigid and rectangular, with uniform length, width and thickness, and, each of which has a lower lengthwise edge and a widthwise title edge—which organizer comprises
   a bottom which defines opposed portions and lengthwise and transverse axes of the container;
   a lower exterior perimetral portion connected with and extending upwardly from the bottom, and
   interior slot means connected with the bottom, having a height not more than the height of the lower exterior perimetral portion, and which define a pluality of slots whereof each slot defines
      a dimension transverse to the lengthwise axis greater than the width of the album but less than the length of an album, and
      a dimension parallel to the lengthwise axis greater than the thickness of an album;
   first and second ledges extending from the lower exterior perimetral portion on opposed portions of the container, and
   an upper retaining portion connected with each ledge;
   so that when such an album is inserted with its title edge upward into one of the slots, it is supported and carried on the bottom, and when an album is placed in the container with its lower lengthwise edge parallel to the transverse axis of the container, it is retained from lateral displacement by the upper perimetral retaining portion and supported at each of its lower corners by one of the ledges.

5. The organizer of claim 4 where the ledges are coplanar and extend outwardly from the lower exterior perimetral portion and which further comprises at least one spacer which is arranged to be inserted into a slot, rest on the bottom, and extend upwardly to a height almost equal to the height of te upper retaining portion above the bottom.

6. The organizer of claim 5 where the interior slot means comprise parallel interior walls intermediate the ledges and at least portions of the tops of such interior walls are substantially coplanar with the two ledges.

7. A carrier for a first type of thin rigid envelopes—which are generally rectangular and have substantially the same shape in terms of their respective lengths, widths and thicknesses—and for a second type of thin rigid envelopes—which are generally rectangular and have length not greater than the width of an envelope of the first type—comprising
   a rectangular bottom which defines opposed portions and longitudinal and transverse axes of the container;
   erect sub-divider portions connected with the bottom which define a plurality of pairs of opposed grooves whereof each such pair define
      a dimension parallel to the transverse axis greater than the width but less than the length of an envelope of the first type, and
      a dimension parallel to the longitudinal axis greater than the thickness of an envelope of the second type; and,
   an exterior wall extending upwardly from the bottom; and
   first and second coplanar ledges extending inwardly from opposed portions of the wall which ledges are spaced downwardly from the top of the wall and have a height above the bottom at not less than the height of a sub-divider portion;
   so when an envelope of the second type is inserted between opposed grooves on the lower level, it is supported by the sub-divider portions and the bottom, and when an envelope of the first type is placed in the container with its lower lengthwise edge transverse to the longitudinal axis, it is retained from lateral displacement by the wall and supported at each of its lower corners by one of the ledges.

8. An organizer comprising the carrier of claim 7 and further comprising at least one spacer which is adapted to be inserted and held intermediate opposed grooves of the carrier and, when so inserted and held, to rest on the bottom and extend upwardly.

9. The carrier of claim 7 where the envelopes of the first type are compact disc albums and the envelopes of the second type are audio casettes.

* * * * *